United States Patent
Stetzer et al.

(10) Patent No.: US 11,454,329 B2
(45) Date of Patent: Sep. 27, 2022

(54) PRESSURE-COMPENSATED, SUBSEA CHEMICAL INJECTION VALVE

(71) Applicant: National Coupling Company, Inc., Stafford, TX (US)

(72) Inventors: Max Stetzer, Houston, TX (US); Josh Williams, Stafford, TX (US); Robert E. Smith, III, Missouri City, TX (US); Chris Roy, Stafford, TX (US)

(73) Assignee: National Coupling Company, Inc., Stafford, TX (US)

( * ) Notice: Subject to any disclaimer, the term of this patent is extended or adjusted under 35 U.S.C. 154(b) by 126 days.

(21) Appl. No.: 17/015,300

(22) Filed: Sep. 9, 2020

(65) Prior Publication Data

US 2021/0071772 A1    Mar. 11, 2021

Related U.S. Application Data

(60) Provisional application No. 62/897,751, filed on Sep. 9, 2019.

(51) Int. Cl.
  *F16K 17/04*    (2006.01)
  *F16K 17/36*    (2006.01)
  (Continued)

(52) U.S. Cl.
  CPC ............... *F16K 17/36* (2013.01); *F16K 3/34* (2013.01); *F16K 17/048* (2013.01); *F16K 17/04* (2013.01);
  (Continued)

(58) Field of Classification Search
  CPC ...... F16K 17/36; F16K 17/048; F16K 17/046; F16K 17/04; F16K 17/26; F16K 3/34; F16K 31/12
  (Continued)

(56) References Cited

U.S. PATENT DOCUMENTS

| 818,411 A | 4/1906 | Bush |
| 2,234,932 A | 3/1941 | Ashton |

(Continued)

FOREIGN PATENT DOCUMENTS

GB    2443920 A    5/2008

OTHER PUBLICATIONS

Combined Search and Examination Report dated Jan. 12, 2021 in Great Britain Counterpart Application No. GB2014197.4.

*Primary Examiner* — Minh Q Le
(74) *Attorney, Agent, or Firm* — Blank Rome LLP (57) ABSTRACT

A gate valve controls fluid communication from an inlet to an outlet relative to a reference pressure. A body defines a passage disposed in communication with the inlet, and an outlet port disposed in the passage communicates the passage with the outlet. A piston disposed in the passage is movable therein between first and second positions relative to the outlet port. The piston is movable in a first direction from the first position to the second position in response to an inlet pressure at the inlet. A gate disposed on the piston is biased transversely toward the outlet port. The gate moved by the piston adjusts flow from the passage to the outlet port. A pressure compensator disposed opposite the piston biases the piston in a second opposite direction from the second position to the first position. The pressure compensator has a chamber in communication with the reference pressure.

28 Claims, 7 Drawing Sheets

(51) Int. Cl.
*F16K 3/34* (2006.01)
*F16K 17/26* (2006.01)
*F16K 31/12* (2006.01)

(52) U.S. Cl.
CPC ............ *F16K 17/046* (2013.01); *F16K 17/26* (2013.01); *F16K 31/12* (2013.01)

(58) Field of Classification Search
USPC .... 137/81.1, 81.2, 78.5, 540, 469, 494, 493, 137/509; 251/176, 175
See application file for complete search history.

(56) References Cited

U.S. PATENT DOCUMENTS

| | | |
|---|---|---|
| 2,474,772 A | 6/1949 | Ashton |
| 2,772,695 A | 12/1956 | Harrison |
| 2,904,066 A | 9/1959 | Freeman |
| 3,027,913 A | 4/1962 | Chatham et al. |
| 3,601,149 A | 8/1971 | Gilmore |
| 3,663,124 A | 5/1972 | Schultz |
| 3,917,220 A | 11/1975 | Gilmore |
| 4,456,028 A | 6/1984 | Watson |
| 4,493,335 A | 1/1985 | Watson |
| 5,782,269 A | 7/1998 | Seaney et al. |
| 6,571,822 B2 | 6/2003 | Neugebauer et al. |
| 6,651,696 B2 | 11/2003 | Hope et al. |
| 7,520,291 B2 | 4/2009 | Watson |
| 7,520,297 B2 * | 4/2009 | Bell ...................... G05D 16/101 251/327 |
| 9,879,799 B2 * | 1/2018 | Matteucci .......... G05D 16/0404 |
| 10,739,796 B2 * | 8/2020 | Martinez ................. E21B 33/06 |
| 11,261,982 B2 * | 3/2022 | Patterson ............... F16K 17/046 |
| 2016/0060996 A1 * | 3/2016 | Patterson ............... G05D 16/10 166/368 |
| 2020/0408316 A1 * | 12/2020 | Patterson ............... F16K 17/048 |

\* cited by examiner

FIG. 5

PRESSURE-COMPENSATED, SUBSEA CHEMICAL INJECTION VALVE

CROSS-REFERENCE TO RELATED APPLICATIONS

This is application claims the benefit of U.S. Provisional Patent Appl. Ser. No. 62/897,751 filed Sep. 9, 2020, which is incorporated herein by reference in its entirety and to which priority is claimed.

BACKGROUND OF THE DISCLOSURE

1. Field of the Disclosure

The subject matter of the present disclosure relates to valves. More particularly, it relates to pressure-compensated valves for use in a subsea environment.

2. Description of the Related Art

U.S. Pat. No. 4,456,028 discloses a relief gate valve. However, the valve is not suitable for use in the subsea environment. It requires manual adjustment for setting the opening pressure and does not compensate for the hydrostatic pressure. Moreover, it has no means for preventing backflow through the valve if, for any reason, the outlet pressure exceeds the inlet pressure.

Figure 1:
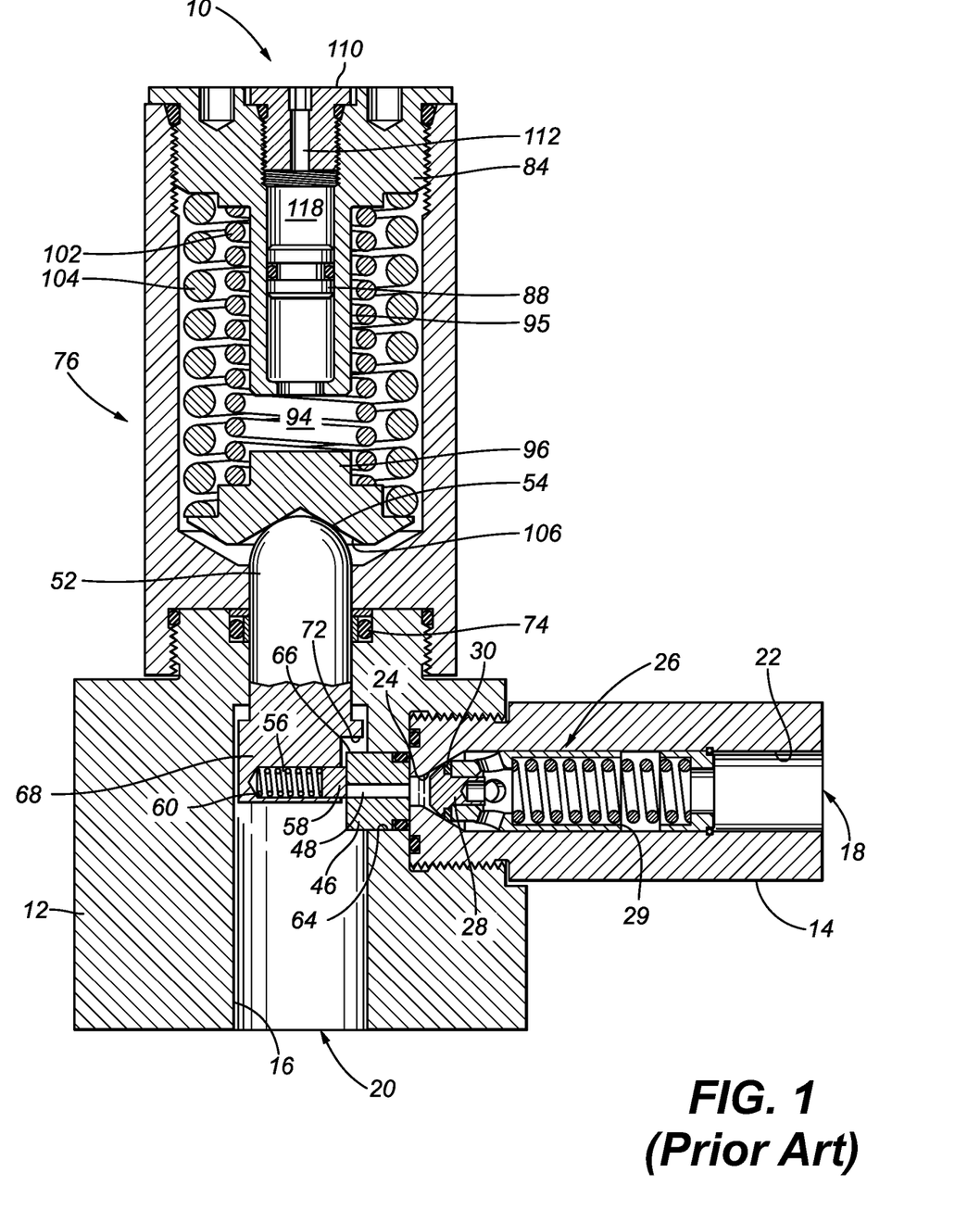
FIG. 1 illustrates a cross-sectional view of a gate valve according to the prior art.

A gate valve suitable for subsea applications is disclosed in U.S. Pat. No. 7,520,291, which is incorporated herein by reference and is shown in FIG. 1. Briefly, the gate valve 10 has three body parts, including a main body part 12, an outlet body part 14, and a pressure compensator 76. The three body parts 12, 14, and 76 are generally rectangular parallelepipeds secured together by threaded engagements.

An axial passage 16 in the main body part 12 forms an inlet 20 that may be adapted to make a connection with a pipe or other conduit leading to a fluid reservoir or line whose pressure may be limited by the valve 10. The passage 16 in the main body 12 further includes transverse cylindrical bore 64 that receives a cylindrical seat ring 46 providing a valve seat. The seat ring 46 has a passage 48 extending axially therethrough. Meanwhile, a cylindrical bore 22 in the outlet part 14 of the valve 10 provides a lateral passage with an outlet 18 that, by way of example, may be adapted to make a fluid connection with a conduit leading to a subsea well.

The inner end of seat ring 46 protrudes into the axial bore 16 in the main body part 12 and its upper edge provides a mechanical stop for positioning a valve actuator 68. The inner face of seat ring 46 may be planar and adapted to seal with a gate or seal disc 58 on the valve actuator 68.

In particular, a blind hole or cavity is provided in one side of actuator 68, and a helical pressure spring 60 disposed within cavity bears at one end against the closed end of cavity and at the other end against the gate or seal disc 58. The pressure of the axially compressed spring 60 presses disc 58 against the face of the seat ring 46 to seal off the passage 48 as long as the disc 58 and the seat ring 46 are coaxial.

The outlet body 14 has a threaded nose section for engaging a corresponding socket in the side of main body 12. A poppet valve 26 has a nose piece 28 with a seal 30 and has a spring 29. The poppet valve 26 fits within the bore 22 of the outer body 14, and the poppet valve 26 can be set in sealing engagement with a conical seat 24 to control communication from the seat passage 48 out the outlet body 18. In this way, the poppet valve 26 acts as a check valve and ensures that fluid only flows through valve 10 in the intended direction.

A valve stem 52 extends coaxially from the actuator 68, and an O-ring 74 in a circumferential groove seals the stem 52 to the body of bore 16. Above the valve stem 52, the pressure compensator 76 threads onto the main body 12. The pressure compensator 76 comprises a central axial chamber 94 within which is disposed concentric helical compression load springs 102 and 104. The upper ends of the load springs bear against a threaded cap 84 which is retained in the central bore of the pressure compensator 76 by engagement with a threaded portion.

The lower ends of the load springs 102 and 104 bear against a generally circular bearing plate 96 having inner and outer shoulders. The bearing plate 96 has a conical socket 106 on its distal face for contacting a hemispherical end 54 of the valve stem 52.

A plug 110 has an orifice 112 in fluid communication with a chamber 118 of a central extension 95 such that one side of a free-floating piston 88 may be normally exposed to ambient pressure, which the other side is exposed to an incompressible fluid in the compensator's chamber 94.

Load springs 102 and 104 act to push the valve stem 52 into the main body part 12 (downward in FIG. 1) until the shoulder 72 on the actuator 68 rests on the upper edge 66 of the inner end of the seat ring 46 that protrudes into the passage 16. In this position, the seal disc 58 may be coaxial with the seat ring passage 48 and the valve 10 is closed. If the inlet pressure rises sufficiently to overcome the combined force of the springs 102 and 104, the ambient pressure, and the gate-seat friction, the actuator 68 moves such that the stem 52 extends farther out of the main body part 12. This action compresses the load springs 102 and 104, expels fluid in the chamber 118 (displacing the piston 88), and the gate seat disc 58 moves away from coaxial alignment with the seat ring passage 48, thereby opening the valve 10.

A reduction in inlet pressure will allow the load springs 102, 104 and the ambient pressure due to the hydrostatic head acting on the stem 52 to return the valve 10 to the closed position wherein the passage 48 is blocked by the seal disc 58.

Although this gate valve 10 may be effective for subsea applications, operators are continually striving to improve performance and reliability while meeting even more extreme and harsh conditions found in a subsea environment.

The subject matter of the present disclosure is directed to overcoming, or at least reducing the effects of, one or more of the problems set forth above.

SUMMARY OF THE DISCLOSURE

As disclosed herein, a gate valve is used for controlling fluid communication from an inlet to an outlet relative to a reference pressure. The inlet and outlet are defined in a receptacle of a component. The gate valve comprises a cartridge, an outlet port, a piston, a gate, and a pressure compensator.

The cartridge is configured to position in the receptacle of the component having the inlet and the outlet. The cartridge is disposed in sealed communication with the inlet and the outlet and defines a passage in communication with the inlet. The outlet port is disposed in the passage and communicates the passage with the outlet. The piston is disposed in the passage and is movable therein between first and second positions relative to the outlet port. The piston is movable in a first direction from the first position to the second position in response to an inlet pressure level at the inlet.

The gate is disposed on the piston and is biased transversely toward the outlet port. The gate moved by the piston adjusts flow from the passage to the outlet port. the pressure compensator is disposed opposite the piston and biases the piston in a second opposite direction from the second position to the first position. The pressure compensator comprises a housing defining a chamber in communication with the reference pressure. The housing is configured to affix in the receptacle and hold the cartridge therein.

The piston can comprise a proximal end disposed toward the inlet; and wherein the pressure compensator comprises a seat component being separate from the housing, the seat component defining an orifice for passage of a distal end of the piston therein.

The seat component can be sandwiched between the housing and the cartridge.

The pressure compensator can comprise: a bearing plate movable in the chamber and engaged with the distal end of the piston; and at least one spring disposed in the chamber and biasing the bearing plate toward the seat component.

The outlet port can comprise a flat seating surface disposed around the outlet port, wherein the gate comprises: a pin disposed in a transverse hole in the piston, and a spring in the transverse hole biasing the pin against the flat seating surface.

The cartridge can define a cross opening communicating the passage outside the cartridge. Also, the outlet port can comprise an insert sealed in the cross opening, the insert defining a first orifice therethrough communicating the passage outside the cartridge.

The gate valve can comprise a retention nut affixed externally in the cross opening and holding the insert in the cross opening, the retention nut having a second orifice in communication with the first orifice of the insert.

The pressure compensator can comprise a vent port communicating the chamber with the reference pressure.

The pressure compensator can further comprise a free-floating piston in the vent port separating internal fluid in the chamber from external fluid outside the pressure compensator.

A gate valve as disclosed herein is used for controlling fluid communication from an inlet to an outlet relative to a reference pressure. The valve comprises a first body, an outlet port, a second body, a piston, a gate, and a pressure compensator.

The first body defines a passage in communication with the inlet at a first end of the gate valve, and the outlet port is disposed in the passage of the first body. The second body is affixed to the first body. The second body defines a chamber in communication with the reference pressure. The first and second bodies defines an interface therebetween communicating the outlet port with the outlet at a second end of the gate valve.

The piston is disposed in the passage and is movable therein between first and second positions relative to the outlet port. The piston is movable in a first direction from the first position to the second position in response to an inlet pressure level at the inlet. The gate is disposed on the piston and is biased transversely toward the outlet port. The gate moved by the piston adjusts flow from the passage to the outlet port. The pressure compensator is disposed in the chamber of the second body opposite the piston and biases the piston in a second opposite direction from the second position to the first position.

The piston can comprise a proximal end disposed toward the inlet; and wherein the pressure compensator comprises a seat component being separate from the first and second bodies, the seat component defining an orifice for passage of a distal end of the piston therein.

The seat component can be sandwiched between the first and second bodies.

The pressure compensator can comprise: a bearing plate movable in the chamber and engaged with the distal end of the piston; and at least one spring disposed in the chamber and biasing the bearing plate toward the seat component.

The outlet port can comprise a flat seating surface disposed around the outlet port, wherein the gate comprises: a pin disposed in a transverse hole in the piston, and a spring in the transverse hole biasing the pin against the flat seating surface.

The gate valve can comprise: a first flow passage defined in the first body and communicating the outlet port with the interface between the first and second bodies; and a second flow passage defined in the second body and communicating the interface with the outlet at the second end of the gate valve.

The interface can comprise an annular chamber formed between the first and second bodies.

The first body can define a cross opening exposed to the passage and disposed in communication with the interface via the first flow passage.

The outlet port can comprise an insert disposed in the cross opening, the insert having a bore with a first opening exposed to the passage, a second opening of the bore exposed to the cross opening in communication with the interface via the first flow passage.

The insert can be sealed in the cross opening.

The gate valve can comprise a retention nut affixed externally in the cross opening and holding the insert in the cross opening.

The pressure compensator can comprise a vent port communicating the chamber with the reference pressure.

The pressure compensator can further comprise a free-floating piston in the vent port separating internal fluid in the chamber from external fluid outside the pressure compensator.

The foregoing summary is not intended to summarize each potential embodiment or every aspect of the present disclosure.

DETAILED DESCRIPTION OF THE DISCLOSURE

Figure 2A:
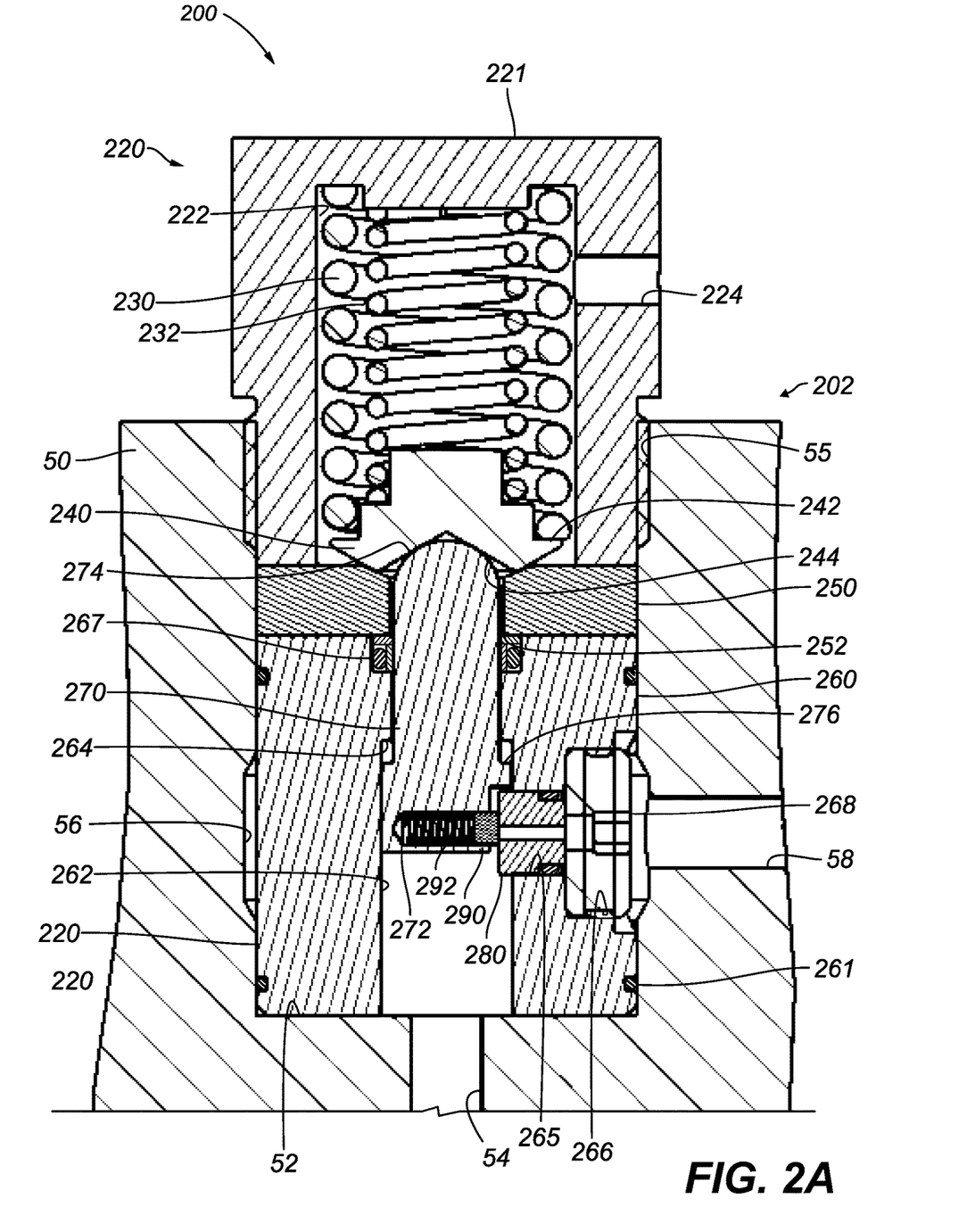
FIG. 2A illustrates a cross-sectional view of a gate valve according to a first embodiment of the present disclosure.

As shown in cross-section in FIG. 2A, a gate valve 200 of a first embodiment is used for controlling fluid communication from an inlet 54 to an outlet 58 of a subsea component 50. In general, the gate valve 200 can be used for a subsea application to control flow of chemical inhibitors, such as for scale, wax, and corrosion, in a subsea production system or for subsea well treatment chemical injection applications. For example, the inlet 54 may have a fluid connection with a pipe or other conduit leading to a fluid reservoir or line whose pressure may be limited by valve 200. The outlet 58 may have a fluid connection with a conduit leading to a subsea well.

The valve 200 is arranged as a pocket-type valve that installs in a pocket or receptacle 52 of the component 50. The valve 200 includes a body 202, an outlet port 280, a piston or actuator 270, a gate 290, and a pressure compensator 220. For assembly, the body 202 includes a cartridge or spool 260, a seat 250, and a compensator housing 221. The cartridge 260 fits into the receptacle 52 between the inlet 54 and the outlet 58 and can be sealed therein using annular seals 261. The seat 250 fits into the receptacle 52 on the cartridge 260, and the compensator housing 221 threads into the receptacle 52 at internal threads 55 to hold the seat 250 and cartridge 260 in the receptacle 52. In addition to being a seat, the seat 250 is a seal retainer for seal 267.

Internally, the body 202 defines a passage 262 in the cartridge 260 disposed in communication with the inlet 54. The outlet port 280 is disposed in a side of this passage 262 and communicates the passage 262 with the outlet 58.

Figure 2B:
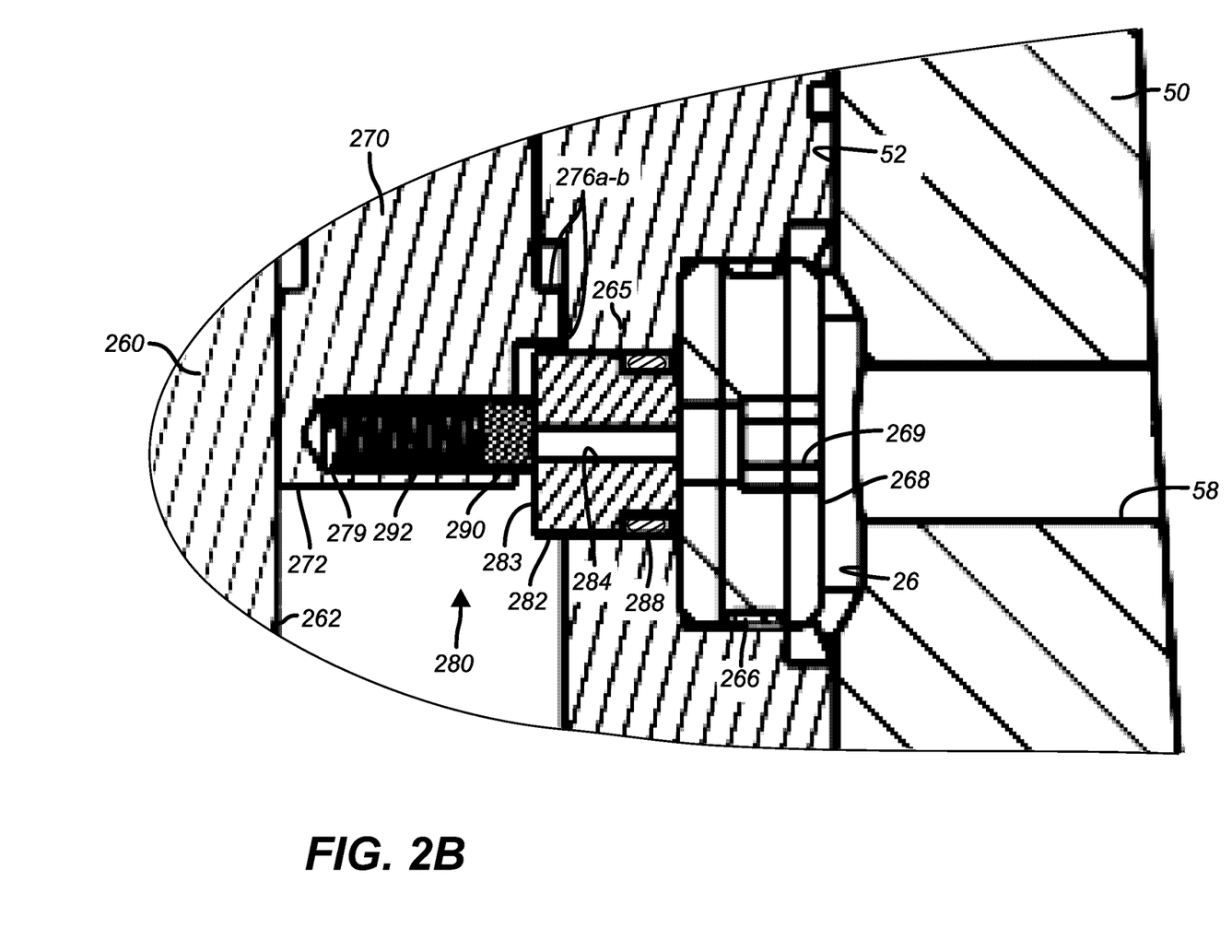
FIG. 2B illustrates a detail of FIG. 2A.

The piston 270 is disposed in the passage 262 of the cartridge 260 and is movable therein between first and second positions relative to the outlet port 280. In particular, the piston 270 is movable in a first direction from a first (downward in FIG. 2A) position to a second (upward in FIG. 2A) position in response to an inlet pressure at the inlet 54 relative to force from the pressure compensator 220 discussed later. (As best shown in the detail of FIG. 2B, a shoulder 264 in the passage 262 and a shoulder 276a on the piston 270 can limit the movement of the piston 270 at the second (upward) position. Meanwhile, an opposite shoulder 276b on the piston 270 can engage an edge of the outlet port 280 to limit the movement of the piston 270 at the first (downward) position.)

As shown in FIG. 2A, the gate 290 is disposed on the piston 270 and is biased transversely toward the outlet port 280. As discussed below, the gate 290 during operation is moved by the piston 270 and adjusts flow through the outlet port 280 for the fluid communication from the inlet 54 to the outlet 58.

The pressure compensator 220 is disposed opposite the piston 270 and acts against pressure at the inlet 54 by biasing the piston 270 in a second opposite direction from the second (upward) position to the first (downward) position. The pressure compensator 220 has a chamber 222 in communication with an opening or vent 224 in the housing 221. The opening 224 is exposed to a reference pressure, which is typically an ambient pressure. Thus, the pressure compensator 220 can be responsive to ambient hydrostatic pressure, but other configurations are possible.

The piston 270 has a first (proximal) end 272 disposed toward the inlet 54. The pressure compensator 220 includes the seat 250, which defines an orifice 252 for passage of a second (distal) end 274 of the piston 270. As shown, the seat 250 is sandwiched between the affixed housing 221 and the held cartridge 260.

The pressure compensator 220 further includes a bearing plate 240 movable in the chamber 222. The bearing plate 240 is engaged with the distal end 274 of the piston 270. At least one spring 230, 232 is disposed in the chamber 222 and biases the bearing plate 240 toward the seat 250.

FIG. 2B illustrates a portion of FIG. 2A and shows the outlet port 280 and gate 290 in more detail. The outlet port 280 has a flat seating surface 283 disposed around the outlet port 280. The gate 290 is disposed in a transverse hole 279 in the piston 270 and includes a spring 292 in the transverse hole 279 biasing the gate 290 against the flat seating surface of the outlet port 280.

As shown in FIG. 2B, the outlet port 280 includes a cylindrical seat insert 282, which is received in a bore 265 of the cartridge 260 and provides a valve seat. The seat insert 282 has a passage 284 extending axially therethrough. The seat insert 282 abuts against the shoulder of a retention nut 268, which has a port 269 that communicates outside the cartridge 260 where an annular groove 56 in the receptacle 52 can communicate with the outlet 58. When it is desired to replace the seat insert 282, the retention nut 268 may be removed, and the seat insert 282 may be pulled out so a new seat insert 282 can be installed by the reverse procedure.

A seal 288, which may be an elastomeric O-ring, is received in an annular groove around the seat insert 282 and seals between and among the seat insert 282, the bore 265, and the adjoining face of the retention nut 268. This seal arrangement presents less opportunity for leakage of fluid from the valve to the environment.

The inner end 283 of seat insert 282 protrudes into axial bore 262 and its upper edge provides a mechanical stop for positioning the piston 270, as noted previously. The inner face 283 of the seat insert 282 may be planar and adapted to seal with the gate 290 of the piston 270.

As detailed in FIG. 2B, the blind or transverse hole 279 is provided in one side of piston 270. The helical pressure spring 292 disposed within the hole 279 bears at one end against the closed end of hole 279 and at the other end against the gate 290 and may be slightly compressed when assembled in the valve 200. The pressure of the axially compressed spring presses gate 290 against the face 283 of the seat insert 282. The gate 290 may be a pin, a cylindrical disc, or the like that extends around and overlaps the periphery of the passage 284 in the seat insert 282, sealing off the passage 284 as long as the gate 290 and seat insert 282 are coaxial.

The outer diameter of the gate 290 may be slightly smaller than the inner diameter of the blind hole 279 so that the gate 290 can slide freely in the cavity 279 and can cant slightly to ensure that it is coplanar with the face 283 of the seat insert 282. The force of the pressure spring 292 may be very small, being of the order of magnitude of one ounce, so that the gate-seat friction due to the force of the pressure spring 292 may be negligible compared to that generated by the pressure of fluid against the gate 290. In certain chemical injection applications, for example, the fluid pressure at the inlet (54) may be as high as 30,000 psi. In those situations, inlet fluid pressure acting over the cross sectional area of the passage 284 in the insert 282 may exert a force of up to several thousand pounds on the gate 290 of valve 200.

Returning back to FIG. 2A, the distal end 274 of the piston 270 extends coaxially away from inlet 54 into a reduced diameter portion of the cylindrical bore 262. A seal 267 in a circumferential groove seals the piston 270 in the bore 262. The distal end 274 may be of larger diameter than the seat's central passage 252. Therefore, the cross section of the piston 270 may be larger than the area of the gate 290 exposed to the differential of inlet and outlet pressure. Therefore, the force of the fluid pressure tending to move the piston 270 in the bore 262 may be greater than the fluid force tending to hold the seal pin 290 against the outlet port 280. Because the frictional force created between the gate 290 and outlet port 280 by the normal force therebetween may be only a small percentage of the normal force, it will be appreciated that variations in the frictional force due to variation in outlet pressure will be reduced compared with the situation if the piston's diameter were smaller than the diameter of bore 284 in the insert 282.

As already described, the pressure compensator 220 comprises the central axial chamber 222 within which is disposed concentric helical compression load springs 230 and 232. The upper ends of the load springs 230, 232 bear inside the housing 221 of the compensator 220. The lower ends of the load springs 230 and 232 bear against the bearing plate 240, which has inner and outer shoulders 242 for the springs 230, 232. The bearing plate 240 may have a conical socket 244 on its opposing face for contacting hemispherical surface on the distal end 274 on the piston 270.

The load springs 230 and 232 act to push the piston 270 into the bore 262 (downward in FIG. 2A) until the shoulder (276a; FIG. 2B) on the piston 270 rests on upper edge of the seat insert 282 protruding into the passage 262. In this position, the gate 290 may be coaxial with the insert's passage 284 and the valve 200 is closed. If the inlet pressure at the inlet 54 rises sufficiently to overcome the combined force of the springs 230 and 232, the ambient pressure in the chamber 222, and the friction between the gate 290 and insert 282, then the piston 270 moves such that the distal end 274 extends further into the compensator 220. This action compresses the load spring(s) 230, 232 and expels fluid in the chamber 222 through the vent 224. The gate 290 moves away from coaxial alignment with the passage 284 in the seat insert 282, thereby opening the valve 200.

A reduction in the inlet pressure at the inlet 54, however, allows the load springs 230, 232 and the ambient pressure due to the hydrostatic head acting on the piston 270 to return the valve 200 to the closed position wherein the passage 284 in the seat insert 282 is blocked by gate 290.

The construction of the valve 200 allows for direct insertion and removal of the valve 200 from the receptacle 52. Furthermore, the construction of the valve 200 allows for ready replacement of the components, such as those needed for sealing, those subject to wear, etc. For example, with the cartridge 260 removed from the receptacle 52, the seat insert 282 for the outlet port 280 can be replaced by removal of the retention nut 268. The piston 270, gate 290, and other elements are all removable and replaceable. The seat 250, which can provide a seal with the bearing plate 240 when the valve 200 is closed, can be replaced when the compensator housing 221 is removed. The entire pressure compensator 220 can be replaced. The various seals 261, 267, 288, etc. can be replaced as needed. As will be appreciated with the benefit of the present disclosure, these and other benefits can be realized with the valve 200 of FIGS. 2A-2B.

Although not shown in FIG. 2A, the component 50 may include an outlet check valve disposed at the outlet 58 to control communication out of the valve 200. In fact, a check valve arrangement similar to poppet 26 in FIG. 1 can be used at the outlet 58 (or elsewhere in the system).

Figure 3:
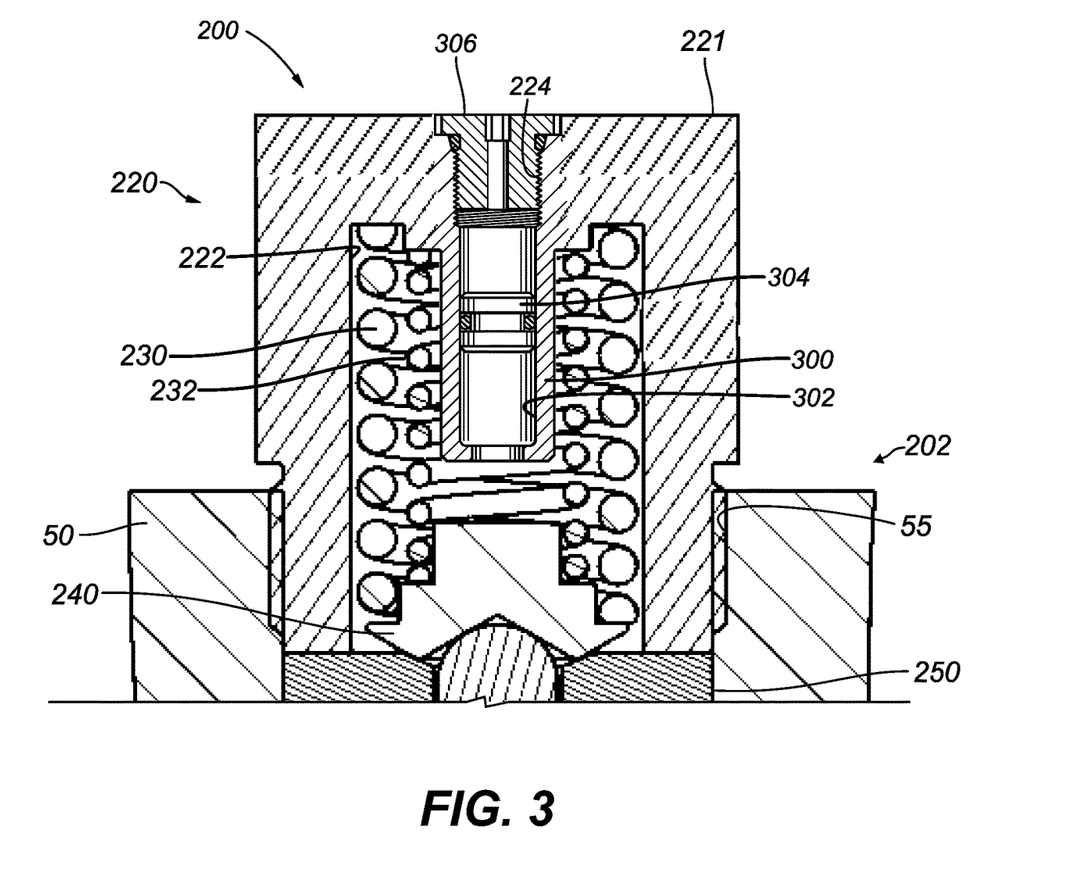
FIG. 3 illustrates a portion of the gate valve in FIG. 2A having an alternate ambient port.

Although not shown in FIG. 2A, the valve 200 can include components to isolate the ambient fluid at the vent 224 from the chamber 222 of the pressure compensator 220. As shown in FIG. 3, for example, the vent 224 can be disposed at the end of the housing 221. The housing 221 can include a central extension 300 having a piston chamber 302 with a free-floating piston 304 disposed therein. A plug 306 having an orifice can be disposed in the vent 224. One side of the free-floating piston 304 can be exposed to seawater, while the opposing side of the piston 304 is exposed to a selected hydraulic fluid filled in the chamber 222. In this way, internal fluid in the housing's chamber 222 can be kept separate from external fluid outside the housing 221, and the actuator piston 270 may not be exposed to the corrosive and/or contaminating effects of seawater.

Figure 4A:
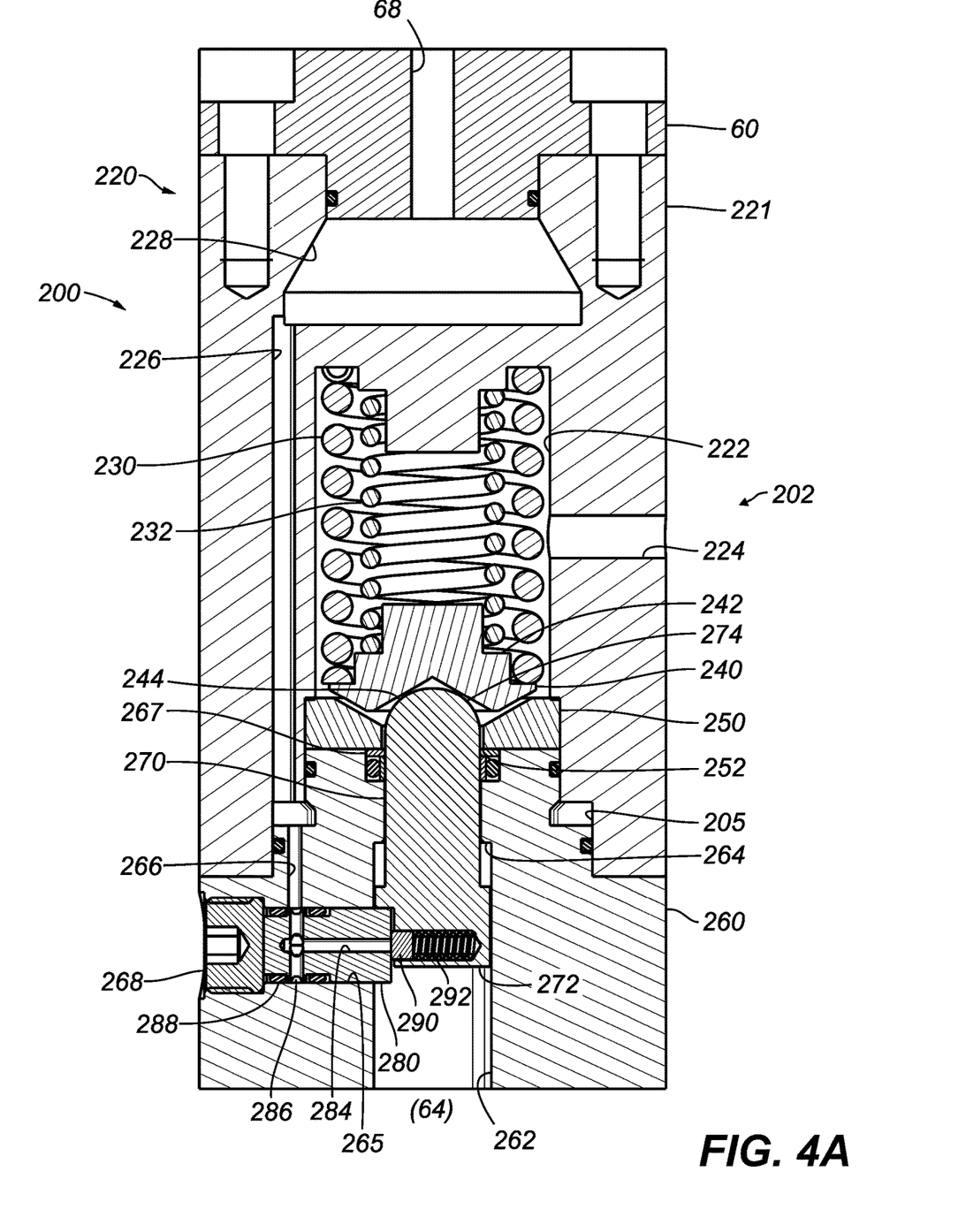
FIG. 4A illustrates a cross-sectional view of a gate valve according to a second embodiment of the present disclosure.

As shown in cross-section in FIG. 4A, a gate valve 200 of a second embodiment is used for controlling fluid communication from an inlet to an outlet of a subsea component (not shown). Similar to the previous embodiment, the gate valve 200 includes a body 202, an outlet port 280, a piston or actuator 270, a gate 290, and a pressure compensator 220. For assembly, the body 202 includes a cartridge or spool 260, a seat 250, and a compensator housing 221. The seat 250 fits into an end of a chamber 222 in the compensator housing 221, and the cartridge 260 fits and seals into the end of the chamber 222 to hold the seat 250 in place.

An adaptor 60 having an outlet 68 affixes to the compensator housing 221 using bolts (not shown) in bolt holes 223. Although not shown in FIG. 4A, the cartridge 260 can attach to the housing 221 using external threads (not shown) on the cartridge 260 mating with internal thread (not shown) on the housing 221. Alternatively, the cartridge 260 can attach to the housing 221 using bolts (not shown) in bolt holes (not shown), which would be offset from the cross-section depicted in FIG. 4A.

The cartridge 260 defines a passage 262, which can be disposed in communication with an inlet (64) of a downhole component (not shown), such as used in subsea production system or in subsea well treatment chemical injection applications. For example, the inlet (64) of the passage 262 can be configured with appropriate fittings or connections for tubing, pipe, or hose and is only generically shown in FIG. 4A. Likewise, the outlet 68 can also be configured with appropriate fittings or connections for tubing, pipe, or hose and is only generically shown in FIG. 4A.

The outlet port 280 is disposed in a side of this passage 262 and communicates the passage 262 with the outlet 68 of the adapter 60 in a manner discussed below.

Figure 4B:
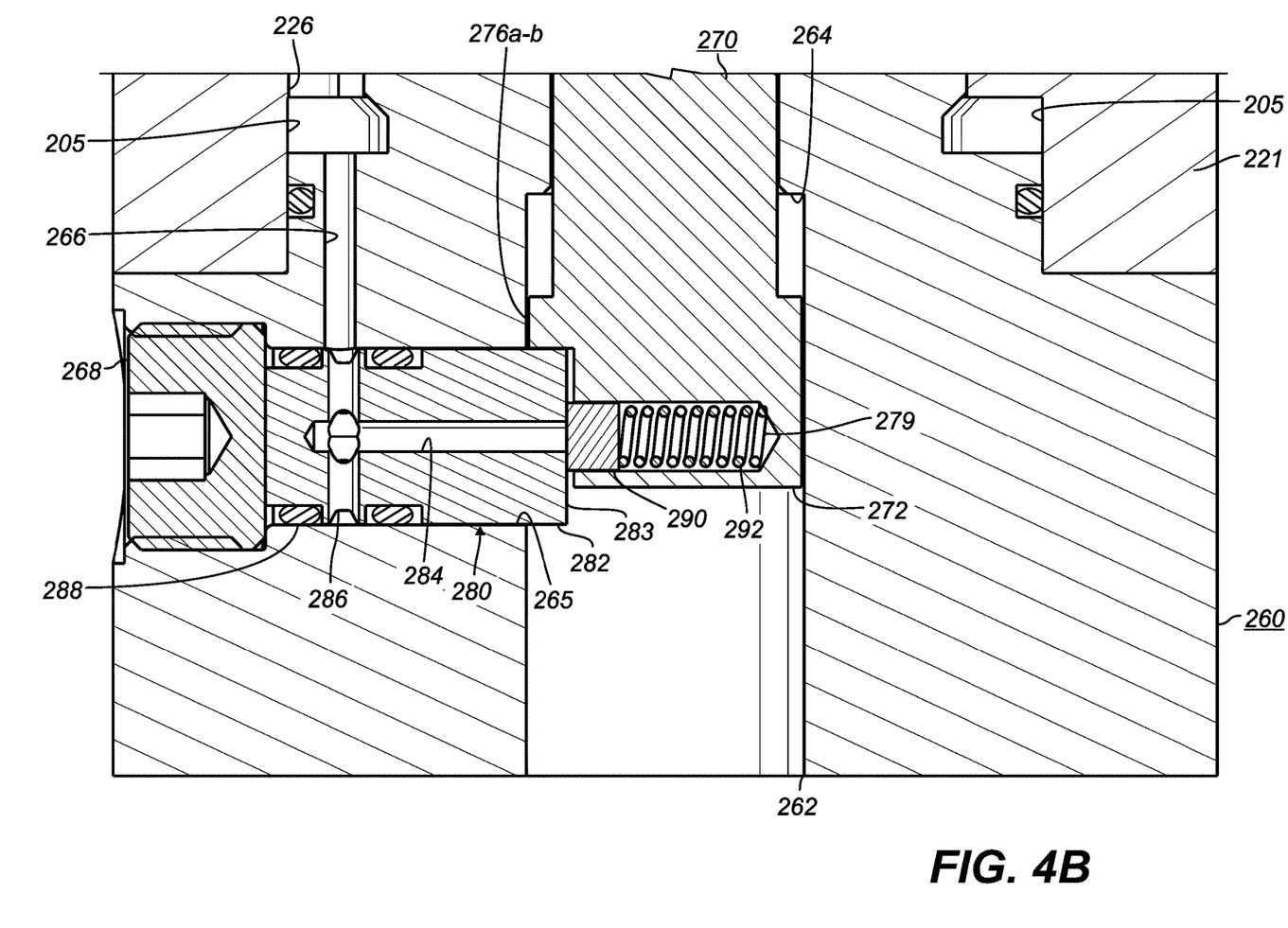
FIG. 4B illustrates a detail of FIG. 4A.

The piston 270 is disposed in the passage 262 of the cartridge 260 and is movable therein between first and second positions relative to the outlet port 280. In particular, the piston 270 is movable in a first direction from a first (downward in FIG. 4A) position to a second (upward in FIG. 4A) position in response to an inlet pressure at the inlet (64) relative to force from the pressure compensator 220 discussed later. (As shown in FIG. 4B, a shoulder 264 in the passage 262 and a shoulder 276a on the piston 270 can limit the movement of the piston 270 at the second (upward) position. Meanwhile, an opposite shoulder 276b on the piston 270 can engage an edge of the outlet port 280 to limit the movement of the piston 270 at the first (downward) position.)

As shown in FIG. 4A, the gate 290 is disposed on the piston 270 and is biased transversely toward the outlet port 280. As discussed below, the gate 290 during operation is moved by the piston 270 and adjusts flow through the outlet port 280 for the fluid communication from the inlet (64) to the outlet 68.

The pressure compensator 220 is disposed opposite the piston 270 and acts against pressure at the inlet (64) by biasing the piston 270 in a second opposite direction from the second (upward) position to the first (downward) position. The pressure compensator 220 has a chamber 222 in communication with an opening 224 in the housing 221. The opening 224 is exposed to a reference pressure, which is typically an ambient pressure. Thus, the pressure compensator 220 can be responsive to ambient hydrostatic pressure, but other configurations are possible.

The piston 270 has a first (proximal) end 272 disposed toward the inlet (64). The pressure compensator 220 includes the seat 250, which defines an orifice 252 for passage of a second (distal) end 274 of the piston 270. As shown and noted previously, the seat 250 is sandwiched between the housing 221 and the cartridge 260.

The pressure compensator 220 further includes a bearing plate 240 movable in the chamber 222. The bearing plate 240 is engaged with the distal end 274 of the piston 270. At least one spring 230, 232 is disposed in the chamber 222 and biases the bearing plate 240 toward the seat 250.

FIG. 4B illustrates a portion of FIG. 4A and shows the outlet port 280 and gate 290 in more detail. The outlet port 280 has a flat seating surface 283 disposed around the outlet port 280. The gate 290 is disposed in a transverse hole 279 in the piston 270 and includes a spring 292 in the transverse hole 279 biasing the gate 290 against the flat seating surface of the outlet port 280.

As shown in FIG. 4B, the outlet port 280 includes a cylindrical seat insert 282, which is received in a bore 265 of the cartridge 260 and provides a valve seat. The seat insert 282 has a passage 284 extending axially therethrough. The seat insert 282 abuts against the shoulder of a retention nut 268. When it is desired to replace the seat insert 282, the retention nut 268 may be removed, and the seat insert 282 may be pulled out so a new seat insert 282 can be installed by the reverse procedure.

A pair of seals 288, which may be elastomeric O-rings, are received in annular grooves around the seat insert 282 and seal between and among the seat insert 282, the bore 265, and the retention nut 268. This seal arrangement presents less opportunity for leakage of fluid from the valve to the environment.

The inner end 283 of seat insert 282 protrudes into axial bore 262 and its upper edge provides a mechanical stop for positioning the piston 270, as noted previously. The inner face 283 of the seat insert 282 may be planar and adapted to seal with the gate 290 of the piston 270.

As detailed in FIG. 4B, the blind or transverse hole 279 is provided in one side of piston 270. The helical pressure spring 292 disposed within the hole 279 bears at one end against the closed end of hole 279 and at the other end against the gate 290 and may be slightly compressed when assembled in the valve 200. The pressure of the axially compressed spring presses gate 290 against the face 283 of the seat insert 282. The gate 290 may be a cylindrical disc that extends around and overlaps the periphery of the passage 284 in the seat insert 282, sealing off the passage 284 as long as the gate 290 and seat insert 282 are coaxial.

The outer diameter of the gate 290 may be slightly smaller than the inner diameter of the blind hole 279 so that the gate 290 can slide freely in the cavity 279 and can cant slightly to ensure that it is coplanar with the face 283 of the seat insert 282. The force of the pressure spring 292 may be very small, being of the order of magnitude of one ounce, so that the gate-seat friction due to the force of the pressure spring 292 may be negligible compared to that generated by the pressure of fluid against the gate 290. In certain chemical injection applications, for example, the fluid pressure at the inlet (64) may be as high as 30,000 psi. In those situations, inlet fluid pressure acting over the cross sectional area of the passage 284 in the insert 282 may exert a force of up to several thousand pounds on the gate 290 of valve 200.

Returning back to FIG. 4A, the distal end 274 of the piston 270 extends coaxially away from inlet (64) into a reduced diameter portion of the cylindrical bore 262. A seal 267 in a circumferential groove seals the piston 270 in the bore 262. The distal end 274 may be of larger diameter than the seat's central passage 252. Therefore, the cross section of the piston 270 may be larger than the area of the gate 290 exposed to the differential of inlet and outlet pressure. Therefore, the force of the fluid pressure tending to move the piston 270 in the bore 262 may be greater than the fluid force tending to hold the gate 290 against the outlet port 280. Because the frictional force created between the gate 290 and outlet port 280 by the normal force therebetween may be only a small percentage of the normal force, it will be appreciated that variations in the frictional force due to variation in outlet pressure will be reduced compared with the situation if the piston's diameter were smaller than the diameter of bore 284 in the insert 282.

As noted previously, the pressure compensator 220 comprises the central axial chamber 222 within which is disposed concentric helical compression load springs 230 and 232. The upper ends of the load springs 230, 232 bear inside the housing 221 of the compensator 220. The lower ends of the load springs 230 and 232 bear against the bearing plate 240, which has inner and outer shoulders 242 for the springs 230, 232. The bearing plate 240 may have a conical socket 244 on its opposing face for contacting a hemispherical surface on the distal end 274 on the piston 270.

The load springs 230 and 232 act to push the piston 270 into the bore 262 (downward in FIG. 4A) until the shoulder (276a; FIG. 4B) on the piston 270 rests on upper edge of the seat insert 282 protruding into the passage 262. In this position, the gate 290 may be coaxial with the insert's passage 284 and the valve 200 is closed. If the inlet pressure at the inlet 64 rises sufficiently to overcome the combined force of the springs 230 and 232, the ambient pressure in the chamber 222, and the friction between the gate 290 and insert 282, then the piston 270 moves such that the distal end 274 extends further into the compensator 220. This action compresses the load spring(s) 230, 232 and expels fluid in the chamber 222 through the vent 224. The gate 290 moves away from coaxial alignment with the passage 284 in the seat insert 282, thereby opening the valve 200.

A reduction in the inlet pressure at the inlet (64), however, allows the load springs 230, 232 and the ambient pressure due to the hydrostatic head acting on the piston 270 to return the valve 200 to the closed position wherein the passage 284 in the seat insert 282 is blocked by the gate 290.

Here, the valve 200 in FIGS. 4A-4B is constructed as a stand-alone unit having first and second body parts 221, 260 affixing in line together. The first body part of the cartridge 260 defines the passage 262 disposed in communication with the inlet (64) at one end which may be adapted to make a connection with a pipe or other conduit leading to a fluid reservoir or line whose pressure may be limited by valve 200, and the second body part of the compensator housing 221 defines the chamber 222 disposed in communication with the reference opening 224. The outlet port 280 in the passage 262 of the cartridge 260 communicates via a first flow passage 266 in the cartridge 260 with an interface 205 between the first and second body parts 260, 221. A second flow passage 226 of the second body part 221 communicates the interface 205 with an outlet chamber 228 disposed in communication with the outlet 68, which, by way of example, may be adapted to make a fluid connection with a conduit leading to a subsea well.

As shown in FIG. 4A, the interface 205 is an annular chamber formed between the first and second body parts 260, 221 sealed together. The first and second flow passages 266, 226 are longitudinal bores extending respectively in the first and second body parts 260, 221 to the interface 205.

As best shown in FIG. 4B, the first body part 260 defines the cross opening 265 exposed to the passage 262 and disposed in communication with the interface 205 via the first flow passage 266. The insert 282 of the outlet port 280 disposed in the cross opening 265 has the central passage 284 exposed to the passage 262. In particular, one or more side openings 286 of the bore 282 are exposed to the cross opening 265 in communication with the interface 205 via the first flow passage 266. The insert 282 is sealed in the cross opening 265 using O-rings 288 surrounding an annular groove for the side openings 286.

The construction of the valve 200 allows for direct insertion and removal of the valve 200 between in-line fittings or connectors at the inlet (64) and outlet (68). Furthermore, the construction of the valve 200 allows for ready replacement of the components, such as those needed for sealing, those subject to wear, etc. For example, the seat insert 282 for the outlet port 280 can be replaced by removal of the retention nut 268. The piston 270, gate 290, and other elements are all removable and replaceable. The seat 250, which can provide a seal with the bearing plate 240 when the valve 200 is closed, can be replaced when the compensator housing 221 is removed from the cartridge 260. The entire pressure compensator 220 can be replaced. The various seals 267, 288, etc. can be replaced as needed. As will be appreciated with the benefit of the present disclosure, these and other benefits can be realized with the valve 200 of FIGS. 4A-4B.

Although not shown in FIG. 4A, the component 50 may include an outlet check valve disposed at the outlet 68 to control communication out of the valve 200. In fact, a check valve arrangement similar to poppet 26 in FIG. 1 can be used at the outlet 68 (or elsewhere in the system).

Figure 5:
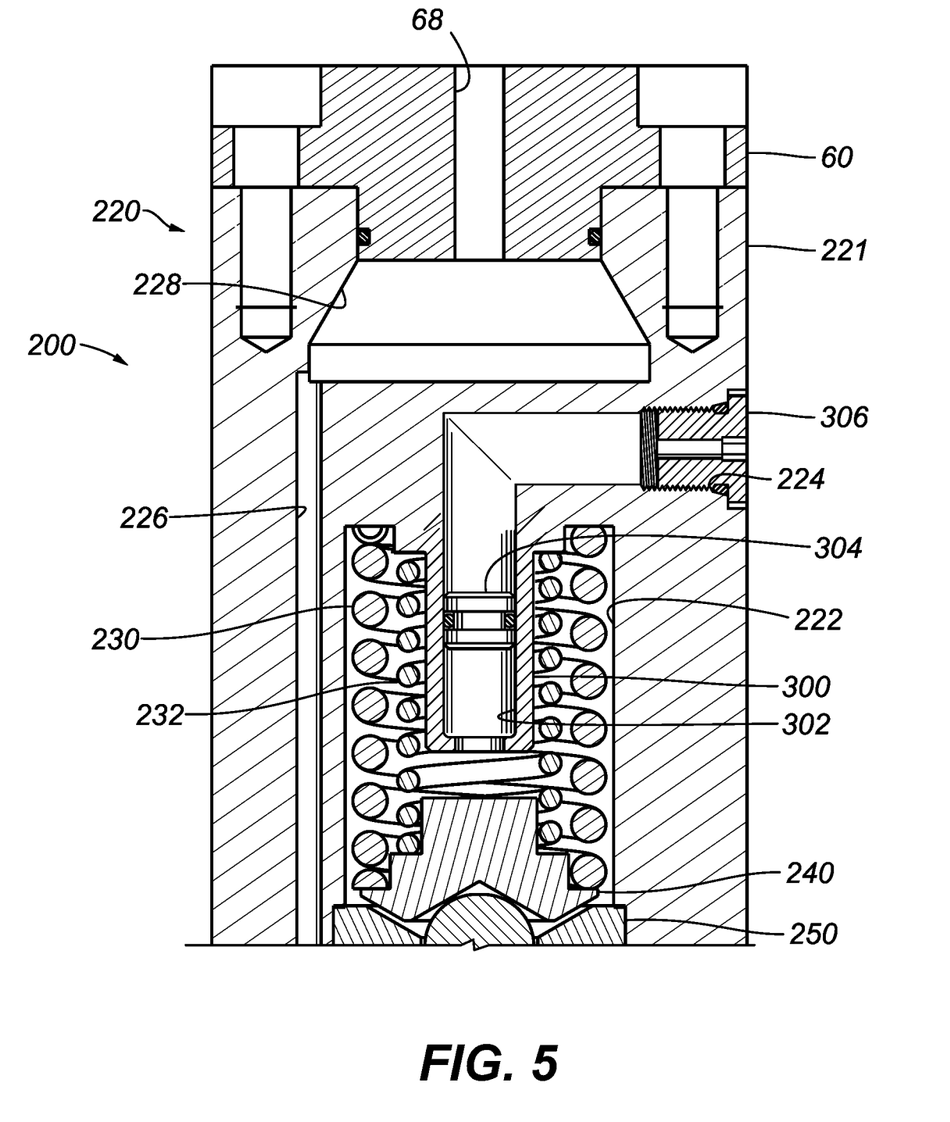
FIG. 5 illustrates a portion of the gate valve in FIG. 4A having an alternate ambient port.

Although not shown in FIG. 4A, the valve 200 can include components to isolate the ambient fluid at the vent 224 from the chamber 222 of the pressure compensator 220. As shown in FIG. 5, for example, the housing 221 can include a central extension 300 having a piston chamber 302 with a free-floating piston 304 therein. A plug 306 having an orifice can be disposed in the vent 224 and can communicate against one side of the free-floating piston 304. In this way, internal fluid in the housing's chamber 222 can be kept separate from external fluid outside the housing 221.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A gate valve for controlling fluid communication from an inlet to an outlet relative to a reference pressure, the inlet and outlet being defined in a receptacle of a component, the gate valve comprising:
   a cartridge configured to position in the receptacle of the component having the inlet and the outlet, the cartridge disposed in sealed communication with the inlet and the outlet and defining a passage in communication with the inlet;
   an outlet port disposed in the passage and communicating the passage with the outlet;
   a piston disposed in the passage and being movable therein between first and second positions relative to the outlet port, the piston being movable in a first direction from the first position to the second position in response to an inlet pressure level at the inlet;
   a gate disposed on the piston and biased transversely toward the outlet port, the gate moved by the piston adjusting flow from the passage to the outlet port; and
   a pressure compensator disposed opposite the piston and biasing the piston in a second opposite direction from the second position to the first position, the pressure compensator comprising a housing defining a chamber in communication with the reference pressure, the housing configured to affix in the receptacle and hold the cartridge therein.

2. The gate valve of claim 1, wherein the piston comprises a proximal end disposed toward the inlet; and wherein the pressure compensator comprises a seat component being separate from the housing, the seat component defining an orifice for passage of a distal end of the piston therein.

3. The gate valve of claim 2, wherein the seat component is sandwiched between the housing and the cartridge.

4. The gate valve of claim 2, wherein the pressure compensator comprises:
   a bearing plate movable in the chamber and engaged with the distal end of the piston; and
   at least one spring disposed in the chamber and biasing the bearing plate toward the seat component.

5. The gate valve of claim 1, wherein the outlet port comprises a flat seating surface disposed around the outlet port, wherein the gate comprises:
   a pin disposed in a transverse hole in the piston, and
   a spring in the transverse hole biasing the pin against the flat seating surface.

6. The gate valve of claim 1, wherein the cartridge defines a cross opening communicating the passage outside the cartridge; and wherein the outlet port comprises an insert sealed in the cross opening, the insert defining a first orifice therethrough communicating the passage outside the cartridge.

7. The gate valve of claim 6, comprising a retention nut affixed externally in the cross opening and holding the insert in the cross opening, the retention nut having a second orifice in communication with the first orifice of the insert.

8. The gate valve of claim 6, comprising first and second annular seals disposed on the outside of the cartridge adjacent the cross opening, the first and second annular seals being configured to seal with the receptacle.

9. The gate valve of claim 1, wherein the pressure compensator comprises a vent port communicating the chamber with the reference pressure.

10. The gate valve of claim 9, wherein the pressure compensator further comprises a free-floating piston in the vent port separating internal fluid in the chamber from external fluid outside the pressure compensator.

11. The gate valve of claim 1, wherein the housing comprises an external thread disposed thereabout and being configured to thread with the receptacle.

12. A gate valve for controlling fluid communication from an inlet to an outlet relative to a reference pressure, the valve comprising:

a first body defining a passage in communication with the inlet at a first end of the gate valve;

an outlet port disposed in the passage of the first body;

a second body affixed to the first body, the second body defining a chamber in communication with the reference pressure, the first and second bodies defining an interface therebetween communicating the outlet port with the outlet at a second end of the gate valve;

a piston disposed in the passage and being movable therein between first and second positions relative to the outlet port, the piston being movable in a first direction from the first position to the second position in response to an inlet pressure level at the inlet, the piston comprising a proximal end disposed toward the inlet and comprising a distal end;

a gate disposed on the piston and biased transversely toward the outlet port, the gate moved by the piston adjusting flow from the passage to the outlet port; and a pressure compensator disposed in the chamber of the second body opposite the piston and biasing the piston in a second opposite direction from the second position to the first position, the pressure compensator comprising a seat component being separate from the first and second bodies, the seat component defining an orifice for passage of the distal end of the piston therein.

13. The gate valve of claim 12, wherein the seat component is sandwiched between the first and second bodies.

14. The gate valve of claim 12, wherein the pressure compensator comprises:
a bearing plate movable in the chamber and engaged with the distal end of the piston; and
at least one spring disposed in the chamber and biasing the bearing plate toward the seat component.

15. The gate valve of claim 12, wherein the outlet port comprises a flat seating surface disposed around the outlet port, wherein the gate comprises:
a pin disposed in a transverse hole in the piston, and
a spring in the transverse hole biasing the pin against the flat seating surface.

16. The gate valve of claim 12, comprising:
a first flow passage defined in the first body and communicating the outlet port with the interface between the first and second bodies; and
a second flow passage defined in the second body and communicating the interface with the outlet at the second end of the gate valve.

17. The gate valve of claim 16, wherein the first body defines a cross opening exposed to the passage and disposed in communication with the interface via the first flow passage.

18. The gate valve of claim 17, wherein the outlet port comprises an insert disposed in the cross opening, the insert having a bore with a first opening exposed to the passage, a second opening of the bore exposed to the cross opening in communication with the interface via the first flow passage.

19. The gate valve of claim 18, wherein the insert is sealed in the cross opening; and wherein a retention nut is affixed externally in the cross opening and is configured to hold the insert in the cross opening.

20. The gate valve of claim 16, wherein the interface comprises an annular chamber formed between the first and second bodies.

21. The gate valve of claim 12, wherein the pressure compensator comprises: a vent port communicating the chamber with the reference pressure; and a free-floating piston in the vent port separating internal fluid in the chamber from external fluid outside the pressure compensator.

22. A gate valve for controlling fluid communication from an inlet to an outlet relative to a reference pressure, the valve comprising:
a first body defining a passage in communication with the inlet at a first end of the gate valve;

an outlet port disposed in the passage of the first body;

a second body affixed to the first body, the second body defining a chamber in communication with the reference pressure, the first and second bodies defining an interface therebetween, the first body defining a first flow passage communicating the outlet port with the interface, the second body defining a second flow passage communicating the interface with the outlet at a second end of the gate valve;

a piston disposed in the passage and being movable therein between first and second positions relative to the outlet port, the piston being movable in a first direction from the first position to the second position in response to an inlet pressure level at the inlet;

a gate disposed on the piston and biased transversely toward the outlet port, the gate moved by the piston adjusting flow from the passage to the outlet port; and a pressure compensator disposed in the chamber of the second body opposite the piston and biasing the piston in a second opposite direction from the second position to the first position.

23. The gate valve of claim 22, wherein the outlet port comprises a flat seating surface disposed around the outlet port, wherein the gate comprises:
a pin disposed in a transverse hole in the piston, and
a spring in the transverse hole biasing the pin against the flat seating surface.

24. The gate valve of claim 22, wherein the interface comprises an annular chamber formed between the first and second bodies.

25. The gate valve of claim 22, wherein the first body defines a cross opening exposed to the passage and disposed in communication with the interface via the first flow passage.

26. The gate valve of claim 25, wherein the outlet port comprises an insert disposed in the cross opening, the insert having a bore with a first opening exposed to the passage, a second opening of the bore exposed to the cross opening in communication with the interface via the first flow passage.

27. The gate valve of claim 26, wherein the insert is sealed in the cross opening; and wherein a retention nut is affixed externally in the cross opening and is configured to hold the insert in the cross opening.

28. The gate valve of claim 22, wherein the pressure compensator comprises:
a vent port communicating the chamber with the reference pressure; and
a free-floating piston in the vent port separating internal fluid in the chamber from external fluid outside the pressure compensator.

* * * * *